(12) United States Patent
Wu

(10) Patent No.: US 8,798,093 B2
(45) Date of Patent: Aug. 5, 2014

(54) METHOD FOR SYNCHRONIZING PDCP OPERATIONS AFTER RRC CONNECTION RE-ESTABLISHMENT IN A WIRELESS COMMUNICATION SYSTEM AND RELATED APPARATUS THEREOF

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/445,941

(22) Filed: Apr. 13, 2012

(65) Prior Publication Data

US 2012/0201228 A1 Aug. 9, 2012

Related U.S. Application Data

(63) Continuation of application No. 12/487,655, filed on Jun. 19, 2009, now Pat. No. 8,396,037.

(60) Provisional application No. 61/074,989, filed on Jun. 23, 2008.

(51) Int. Cl.
*H04J 3/16* (2006.01)
*H04M 1/66* (2006.01)

(52) U.S. Cl.
USPC ............................................. 370/466; 455/410

(58) Field of Classification Search
None
See application file for complete search history.

(56) References Cited

U.S. PATENT DOCUMENTS

2003/0157927 A1 8/2003 Yi
2003/0210676 A1* 11/2003 Wu ............................... 370/350
2006/0034204 A1 2/2006 Lee
2008/0293416 A1 11/2008 Yi
2008/0310367 A1 12/2008 Meylan
2009/0111423 A1* 4/2009 Somasundaram et al. ..... 455/410
2009/0175163 A1* 7/2009 Sammour et al. ............. 370/216
2009/0225711 A1 9/2009 Sammour
2010/0091709 A1* 4/2010 Yi et al. ......................... 370/328
2010/0103814 A1 4/2010 Chun
2010/0240385 A1 9/2010 Löhr
2010/0246382 A1* 9/2010 Yi et al. ......................... 370/216
2013/0070614 A1 3/2013 Somasundaram

FOREIGN PATENT DOCUMENTS

| CN | 1977497 A | 6/2007 |
| EP | 1337125 A2 | 8/2003 |
| WO | 2005109778 A1 | 11/2005 |

OTHER PUBLICATIONS

European patent application No. 11008366.4, European Search Report mailing date: Apr. 12, 2012.
3GPP TS 36.323 V8.1.0, 3rd Generation Partnership Project; Technical Specification Group Radio Access Network; Evolved Universal Terrestrial Radio Access (E-UTRA); Packet Data Convergence Protocol (PDCP) specification (Release 8), Mar. 2008.

(Continued)

*Primary Examiner* — Eunsook Choi
(74) *Attorney, Agent, or Firm* — Winston Hsu; Scott Margo

(57) ABSTRACT

A method used in an E-UTRAN for synchronizing PDCP operations after a RRC connection re-establishment procedure with a user equipment (UE) is provided. The method includes: initiating an RRC reconfiguration procedure to resume all radio bearers other than a signaling radio bearer 1 (SRB1) when an RRC connection is re-established; re-transmitting a designated group of PDCP Service Data Units (SDUs) to the UE when a data radio bearer (DRB) mapped on Radio Link Control (RLC) Acknowledged Mode (AM) is resumed.

10 Claims, 11 Drawing Sheets

(56) References Cited

OTHER PUBLICATIONS

3GPP TS 36.331 V8.2.0, 3rd Generation Partnership Project; Technical Specification Group Radio Access Network; Evolved Universal Terrestrial Radio Access (E-UTRA) Radio Resource Control (RRC); Protocol specification (Release 8), May 2008.

Office action mailed on Mar. 24, 2011 for the China application No. 200910150596.2, filing date Jun. 23, 2009, p. 1-5.

3GPP TS 36.323 V8.4.0 (Dec. 2008), "3rd Generation Partnership Project; Technical Specification Group Radio Access Network; Evolved Universal Terrestrial Radio Access (E-UTRA); Packet Data Convergence Protocol (PDCP) specification (Release 8)", pp. 1-24.

3GPP TS 36.331 V8.4.0 (Dec. 2008), "3rd Generation Partnership Project; Technical Specification Group Radio Access Network; Evolved Universal Terrestrial Radio Access (E-UTRA) Radio Resource Control (RRC); Protocol specification (Release 8)", pp. 1-197.

Office action mailed on Mar. 15, 2013 for the European application No. 09008214.0 filing date: Jun. 23, 2009, p. 1-32.

Office action mailed on Dec. 5, 2013 for the U.S. Appl. No. 13/585,852, filed Aug. 15, 2012, p. 1-14.

\* cited by examiner

METHOD FOR SYNCHRONIZING PDCP OPERATIONS AFTER RRC CONNECTION RE-ESTABLISHMENT IN A WIRELESS COMMUNICATION SYSTEM AND RELATED APPARATUS THEREOF

CROSS REFERENCE TO RELATED APPLICATIONS

This application is a continuation application of and claims the benefits of U.S. application Ser. No. 12/487,655, filed 2009 Jun. 19, which claims the benefits of U.S. Provisional Application No. 61/074,989, filed 2008 Jun. 23, and is included herein by reference.

BACKGROUND OF THE INVENTION

1. Field of the Invention

The present invention relates to a wireless communication system, and more particularly, to a method for synchronizing PDCP operations after RRC connection re-establishment in a wireless communication system and a related device.

2. Description of the Prior Art

A long-term evolution (LTE) system, initiated by the third generation partnership project (3GPP), is now being regarded as a new radio interface and a radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Please refer to FIG. 1. FIG. 1 is a diagram showing the architecture of the radio interface protocol of a LTE system according to the prior art. As shown in FIG. 1, the radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

FIG. 2 is a diagram showing an RRC re-establishment procedure of the LTE system according to the prior art. As can be seen from FIG. 2, if an RRC connection is disconnected due to radio link failure, an RRC re-establishment procedure needs to be initiated to re-establish the RRC connection. In the beginning, the UE 110 sends an RRC Connection Re-establishment request message to the E-UTRAN 120. Upon reception of the RRC Connection re-establishment request message, the E-UTRAN 120 responds by sending an RRC Connection Re-establishment message to the UE 110. When receiving the RRC Connection Re-establishment message, the UE resumes a signal radio bearer 1 (SRB1) and configures a lower layer to re-activate security (including integrity protection and ciphering) using the previously configured algorithm immediately. In other words, integrity protection and ciphering shall be applied to all subsequent messages received and sent by the UE 110. After that, the UE 110 sends an RRC Connection re-establishment complete message to notify the E-UTRAN 120 that the RRC connection is connected again. To resume all radio bearers other than the SRB1, the E-UTRAN 120 shall initiate an RRC Connection reconfiguration procedure after the RRC connection is re-established, wherein the RRC Connection reconfiguration procedure is to modify the RRC connection.

However, it is not clearly specified how to resume SRBs and data radio bearers (DRBs) after the RRC Connection re-establishment procedure and the subsequent RRC connection reconfiguration in some scenarios. For example, if the UE 110 is handed over from a first eNodeB to a second eNodeB, the compressor's context in a transmitting PDCP entity has been updated while the decompressor's context in a receiving PDCP entity has not been updated. Therefore, header decompressions in the receiving PDCP entity cannot decompress the PDCP SDUs correctly after resumption. Hence, a mechanism for synchronizing PDCP operations after RRC connection re-establishment needs to be improved.

SUMMARY OF THE INVENTION

It is one of the objectives of the present invention to provide a method for synchronizing PDCP operations after RRC connection re-establishment in a wireless communication system and related devices to solve the abovementioned problems.

According to an exemplary embodiment of the present invention, a communication device of a wireless communication system for synchronizing Packet Data Convergence Protocol (PDCP) operations with another communication device is provided. The communication device comprises means for performing an RRC Reconfiguration procedure to resume all radio bearers other than a signaling radio bearer 1 (SRB1) when an RRC connection is re-established, and means for transmitting PDCP Service Data Units (SDUs) with a reset header compression protocol or receiving PDCP Service Data Units (SDUs) with a reset header de-compression protocol after a designated data radio bearer (DRB) is resumed.

According to another exemplary embodiment of the present invention, an communication device for synchronizing Packet Data Convergence Protocol (PDCP) operations with a user equipment (UE) is provided. The communication device comprises: means for initiating an RRC Reconfiguration procedure to resume all radio bearers other than a signaling radio bearer 1 (SRB1) when an RRC connection is re-established; means for re-transmitting a designated group of PDCP Service Data Units (SDUs) to the UE when a data radio bearer (DRB) mapped on Radio Link Control Acknowledged Mode (RLC AM) is resumed; means for generating a new base-key (KeNB) corresponding to a Radio Resource Control (RRC) connection re-establishment procedure, and generating a new ciphering key from the new KeNB; and means for utilizing the new ciphering key to cipher the re-transmitted PDCP SDUs.

According to another exemplary embodiment of the present invention, a communication device for synchronizing Packet Data Convergence Protocol (PDCP) operations with an Evolved UMTS Terrestrial Radio Access Network (E-UTRAN) is disclosed. The communication device comprises: means for resuming all radio bearers other than a signaling radio bearer 1 (SRB1) when an RRC connection is re-established; means for receiving a designated group of PDCP Service Data Units (SDUs) transmitted from the E-UTRAN when a data radio bearer (DRB) mapped on Radio Link Control Acknowledged Mode (RLC AM) is resumed; means for generating a new base-key (KeNB) corresponding to a Radio Resource Control (RRC) connection re-establishment procedure, and generating a new ciphering key from the new KeNB; and means for utilizing the new ciphering key to decipher the re-transmitted PDCP SDUs.

According to another exemplary embodiment of the present invention, a method for synchronizing Packet Data Convergence Protocol (PDCP) operations in a wireless communication system is disclosed. The method comprises: performing an RRC Reconfiguration procedure to resume all radio bearers other than a signaling radio bearer 1 (SRB1) when an RRC connection is re-established; and transmitting PDCP Service Data Units (SDUs) with a reset header compression protocol or receiving PDCP Service Data Units (SDUs) with a reset header de-compression protocol after a designated data radio bearer (DRB) is resumed.

According to another exemplary embodiment of the present invention, a method of synchronizing Packet Data Convergence Protocol (PDCP) operations with a user equipment (UE) is disclosed. The method comprises: initiating an RRC Reconfiguration procedure to resume all radio bearers other than a signaling radio bearer 1 (SRB1) when an RRC connection is re-established; re-transmitting a designated group of PDCP Service Data Units (SDUs) to the UE when a data radio bearer (DRB) mapped on Radio Link Control Acknowledged Mode (RLC AM) is resumed; generating a new base-key (KeNB) corresponding to a Radio Resource Control (RRC) connection re-establishment procedure, and generating a new ciphering key from the new KeNB; and utilizing the new ciphering key to cipher the re-transmitted PDCP SDUs.

According to another exemplary embodiment of the present invention, a method synchronizing Packet Data Convergence Protocol (PDCP) operations with an Evolved UMTS Terrestrial Radio Access Network (E-UTRAN) is disclosed. The method comprises: resuming all radio bearers other than a signaling radio bearer 1 (SRB1) when an RRC connection is re-established; receiving a designated group of PDCP Service Data Units (SDUs) transmitted from the E-UTRAN when a data radio bearer (DRB) mapped on Radio Link Control Acknowledged Mode (RLC AM) is resumed; generating a new base-key (KeNB) corresponding to a Radio Resource Control (RRC) connection re-establishment procedure, and generating a new ciphering key from the new KeNB; and utilizing the new ciphering key to decipher the re-transmitted PDCP SDUs.

In summary, the present invention provides a method for synchronizing PDCP operations after RRC Connection re-establishment in a wireless communication system and a related device. Through adopting the mechanism disclosed in the present invention, the PDCP operations between the UE and the E-UTRAN after RRC connection re-establishment can be synchronized to avoid the following issues, such as the missing PDCP SDU issue in RLC AM, the header decompression failure issue, the inefficient key usage issue, and the ciphering key issue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
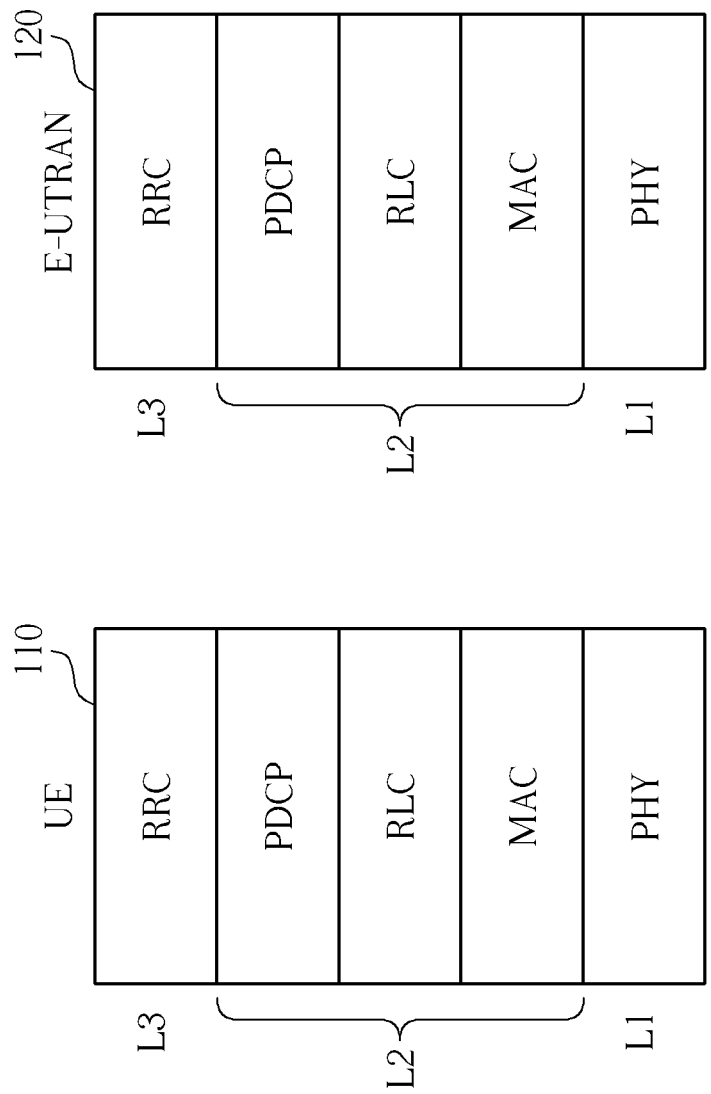
FIG. 1 is a diagram showing the architecture of the radio interface protocol of an LTE system according to the prior art.
Figure 2:
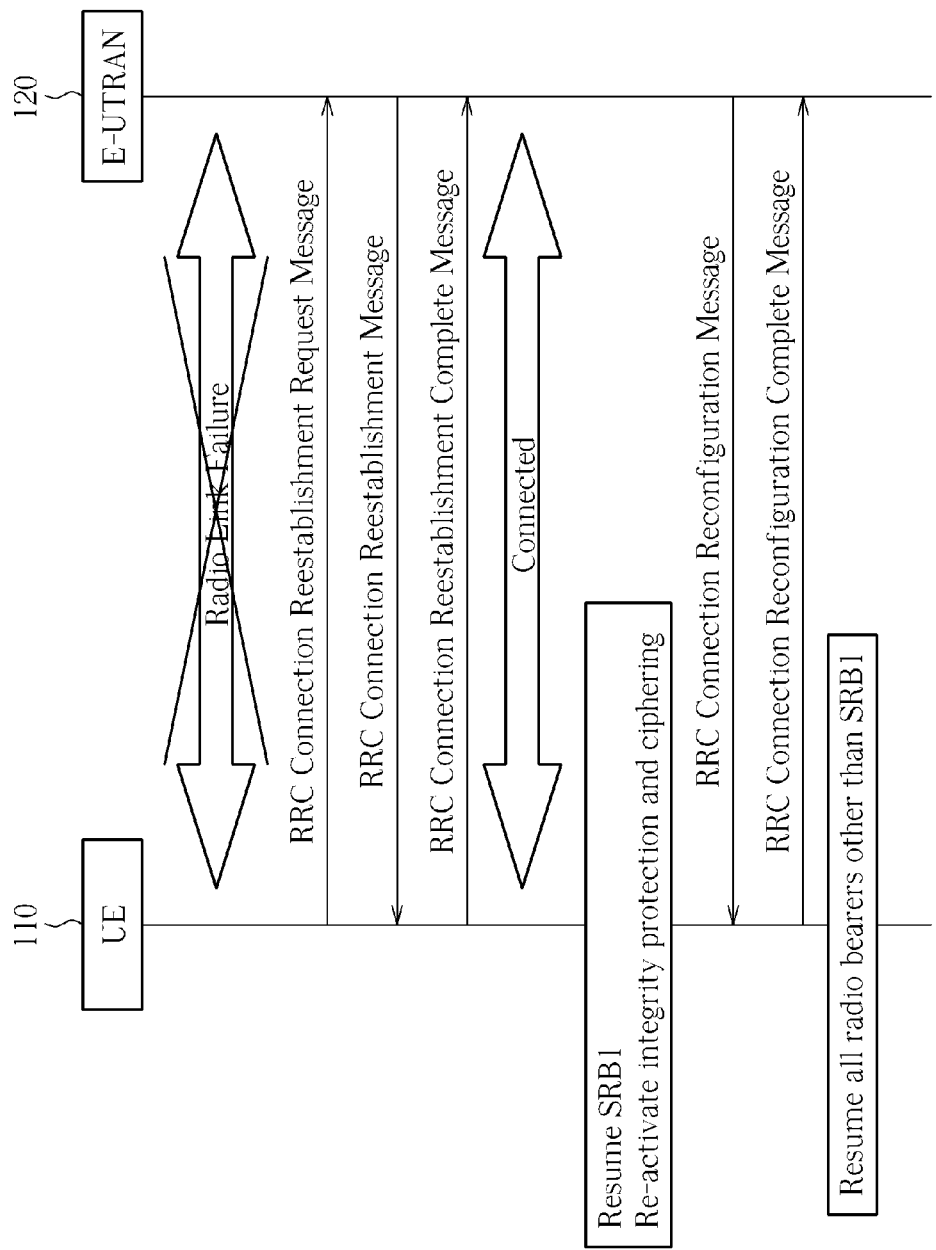
FIG. 2 is a diagram showing an RRC re-establishment procedure of the LTE system according to the prior art.
Figure 3:
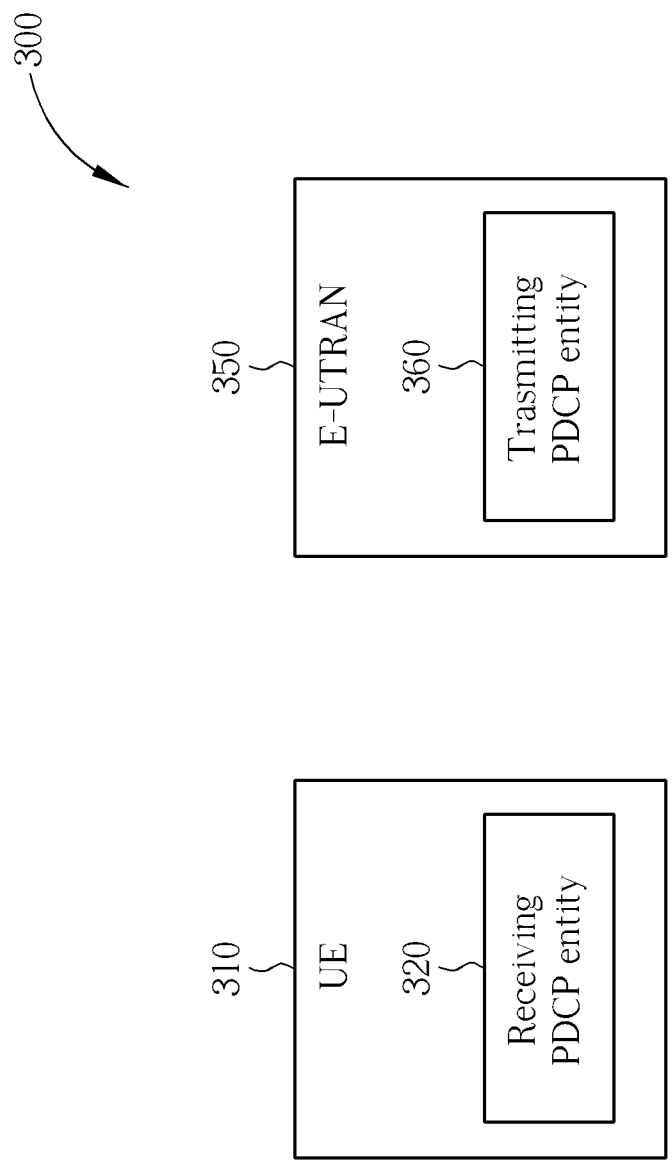
FIG. 3 is a block diagram showing a wireless communication system according to an embodiment of the present invention.

Please refer to FIG. 3. FIG. 3 is a block diagram showing a wireless communication system 300 according to an embodiment of the present invention. The wireless communication system 300 can be an LTE system, but this should not be a limitation of the present invention, and can be wireless communication systems of other types. The wireless communication system 300 includes, but is not limited to, a UE 310 and an E-UTRAN 350. The UTRAN E-350 includes a transmitting PDCP entity 360, and the UE 310 includes a receiving PDCP entity 320. Operations of the transmitting PDCP entity 360 and the receiving PDCP entity 320 will be detailed in the embodiments below.

Figure 7:
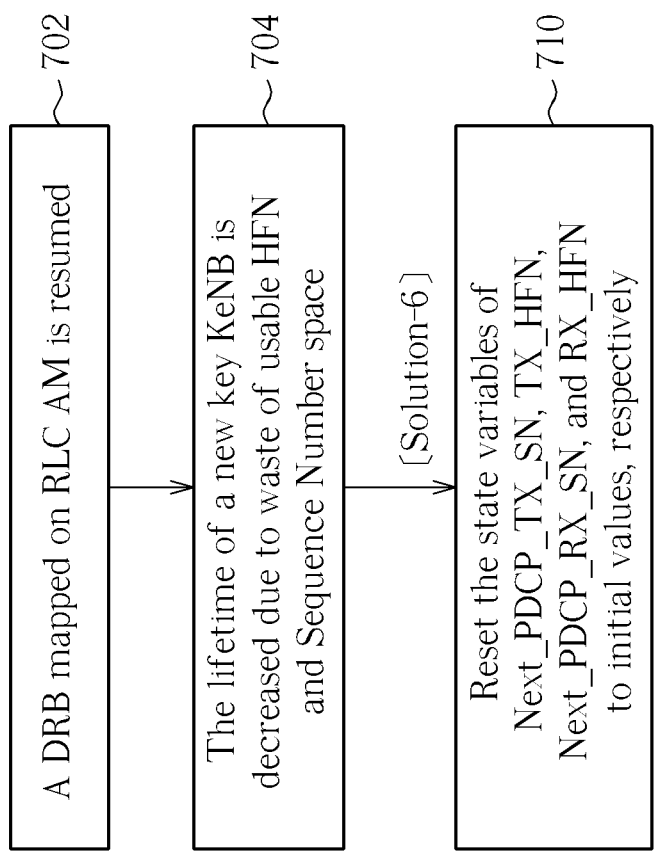
FIG. 7 is a flowchart illustrating a method for synchronizing PDCP operations after RRC connection re-establishment in a wireless communication system according to another exemplary embodiment of the present invention.
Figure 8:
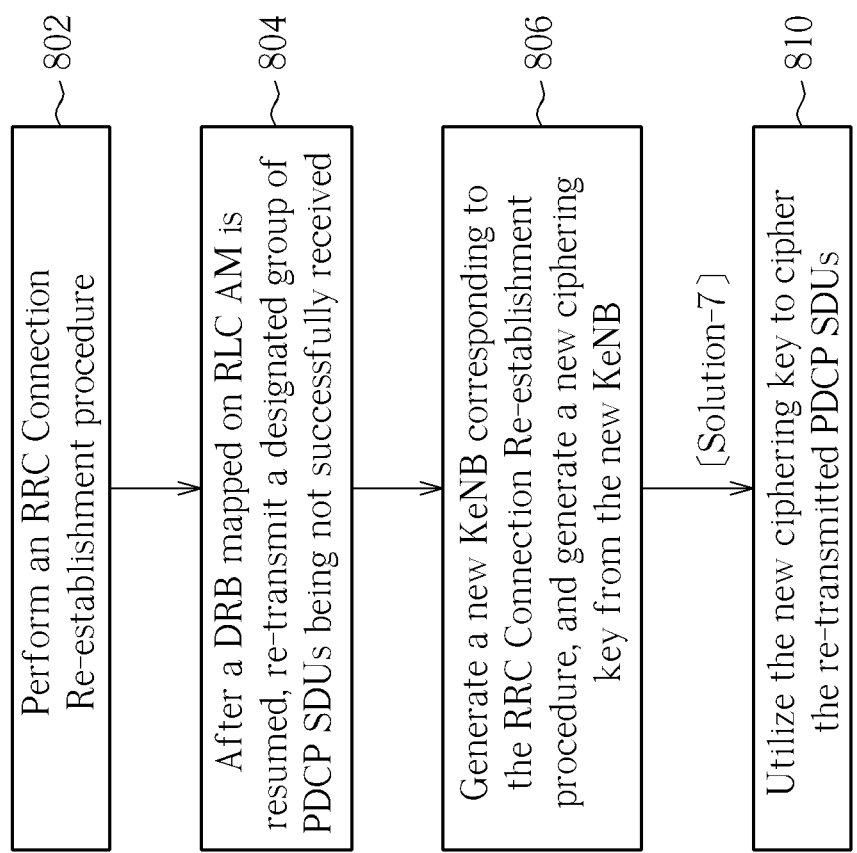
FIG. 8 is a flowchart illustrating a method for synchronizing PDCP operations after RRC connection re-establishment in a wireless communication system according to another exemplary embodiment of the present invention.
Figure 9:
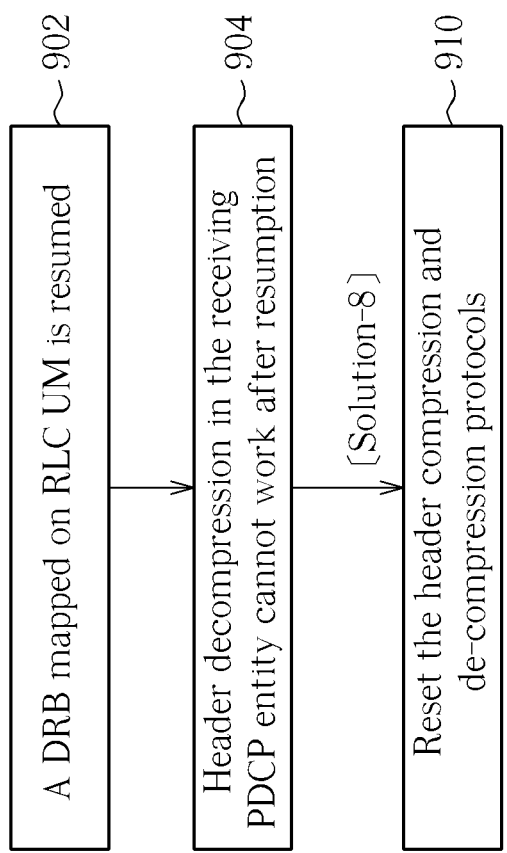
FIG. 9 is a flowchart illustrating a method for synchronizing PDCP operations after RRC connection re-establishment in a wireless communication system according to another exemplary embodiment of the present invention.
Figure 10:
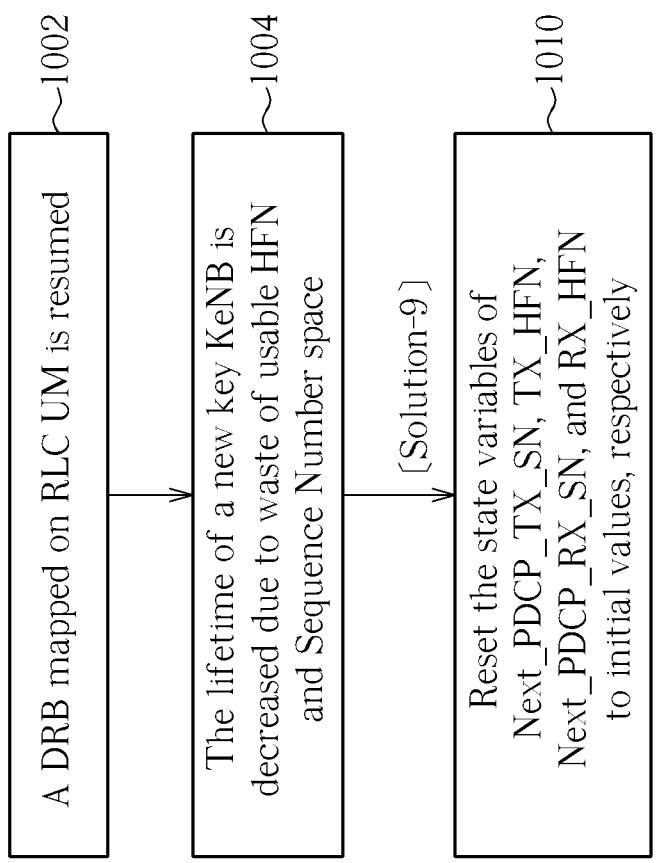
FIG. 10 is a flowchart illustrating a method for synchronizing PDCP operations after RRC connection re-establishment in a wireless communication system according to another exemplary embodiment of the present invention.
Figure 11:
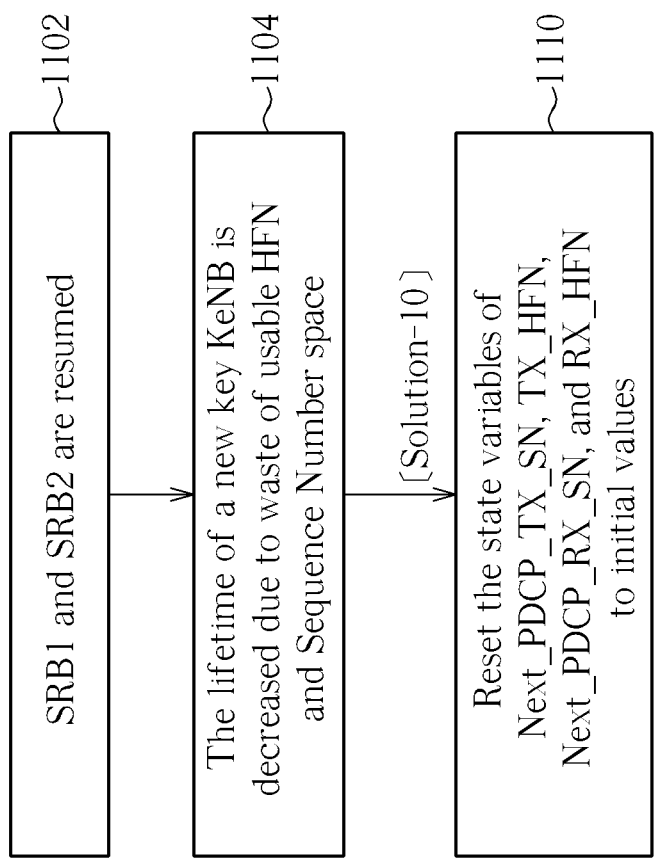
FIG. 11 is a flowchart illustrating a method for synchronizing PDCP operations after RRC connection re-establishment in a wireless communication system according to another exemplary embodiment of the present invention.

Please note that In the following embodiments, FIG. 4-FIG. 8 are examples for resumption of DRBs mapped on Radio Link Control Acknowledged Mode (RLC AM), FIG. 9-FIG. 10 are examples for resumption of DRBs mapped on RLC UM, and FIG. 11 is an example for resumption of an SRB1 and an SRB2.

Figure 4:
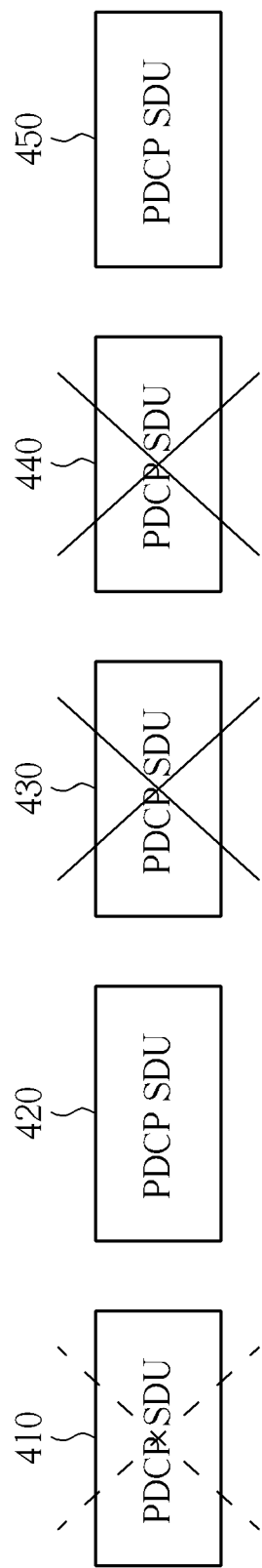
FIG. 4 is a diagram illustrating PDCP SDUs received by a receiving PDCP entity.

Please refer to FIG. 4. FIG. 4 is a diagram illustrating PDCP SDUs received by the receiving PDCP entity 320 shown in FIG. 3. As shown in FIG. 4, five PDCP SDUs 410-450 are in-sequence transmitted by the transmitting PDCP entity 360. In this embodiment, the PDCP SDUs 410-450 are transmitted in RLC AM, thus the receiving PDCP entity 320 needs to send an RLC acknowledgement to confirm the reception of the PDCP SDUs. After a DRB mapped on RLC AM is resumed, the PDCP SDUs 420 and 450 are successfully received while the PDCP SDUs 410, 430, and 440 are not successfully received by the receiving PDCP entity 320 due to radio link failure. Actually, the PDCP SDU 410 is successfully received but has not been confirmed yet by a lower layer of the receiving PDCP entity 320. To recover the missing PDCP SDUs, three solutions are proposed below.

[Solution-1]: After the DRB mapped on RLC AM is resumed, the transmitting PDCP entity 360 retransmits all the PDCP SDUs 410-450 from the first PDCP SDU 410 of which a successful delivery of corresponding PDCP PDUs have not been confirmed by the lower layer.

This solution can solve the PDCP SDU missing issue above, but wastes radio resource due to re-transmission.

[Solution-2]: After the DRB mapped on RLC AM is resumed, the transmitting PDCP entity 360 retransmits the PDCP SDUs of which the successful delivery of the corresponding PDCP PDUs has not been confirmed by the lower layer. In other words, the PDCP SDUs 410, 430, and 440 are re-transmitted. This solution can improve the method mentioned in the first solution, but still wastes radio resource due to re-transmission.

[Solution-3]: After the DRB mapped on RLC AM is resumed, the receiving PDCP entity 320 transmits a PDCP status report configured by RRC to the transmitting PDCP entity 360. After that, the transmitting PDCP entity 360 re-transmits the PDCP SDUs negatively acknowledged in the PDCP status report. In other words, the PDCP SDUs 430 and 440 are re-transmitted according to the PDCP status report. If an in-sequence delivery of upper layer PDUs is needed in the second solution and the third solution, the receiving PDCP entity 320 needs to decipher the received out-of sequence PDCP SDUs and reorder them. A timer is started for reordering the received PDCP SDUs when the DRB mapped on RLC AM is resumed. When the timer expires, the reordering is done and the received PDCP SDUs are delivered to an upper layer.

Figure 5:
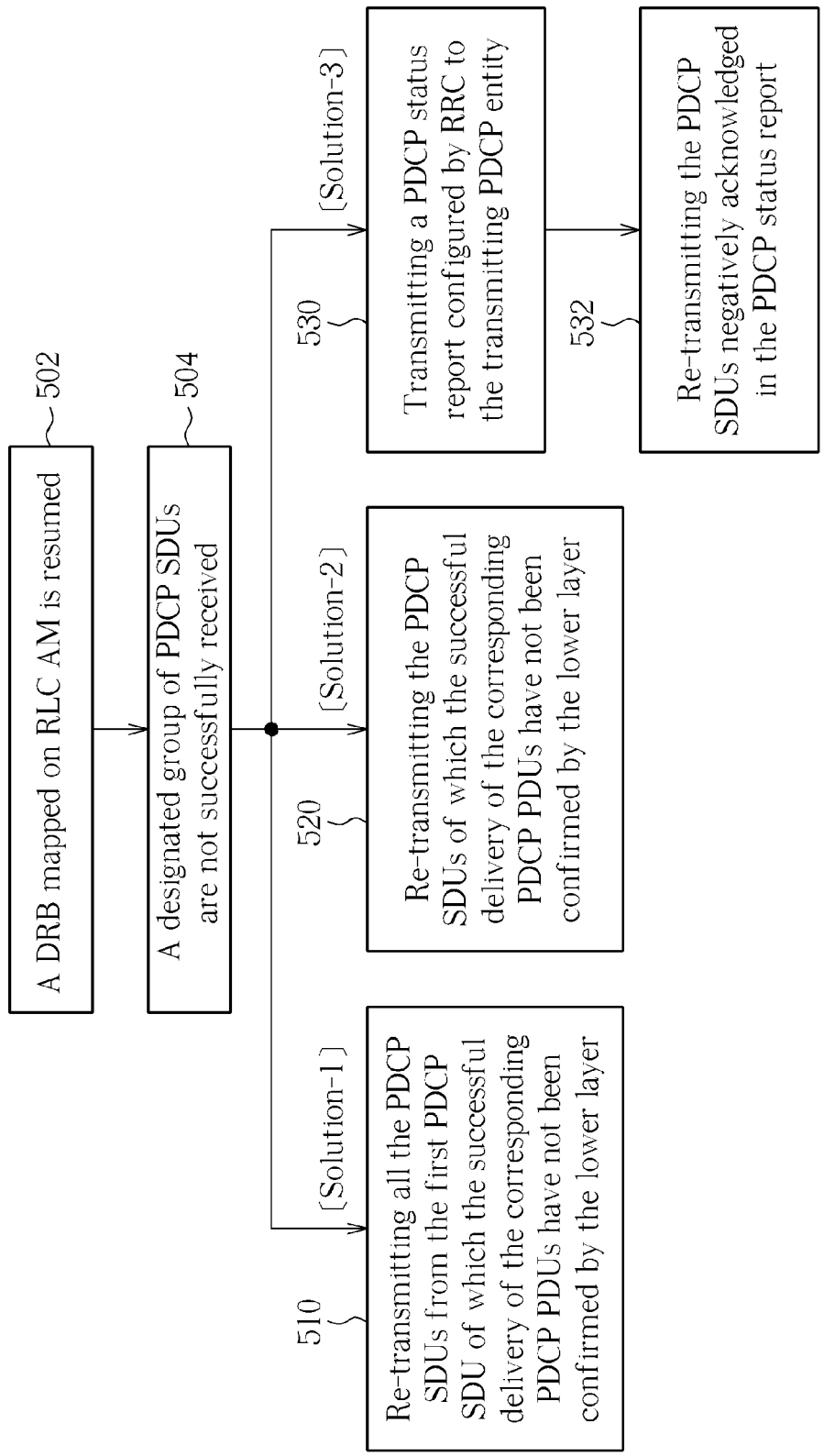
FIG. 5 is a flowchart illustrating a method for synchronizing PDCP operations after RRC connection re-establishment in a wireless communication system according to an exemplary embodiment of the present invention.

The abovementioned solutions 1-3 are shown in FIG. 5, which is a flowchart illustrating a method for synchronizing PDCP operations after RRC Connection Re-establishment in a wireless communication system according to an exemplary embodiment of the present invention. The method includes the following steps:

Step 502: A DRB mapped on RLC AM is resumed.

Step 504: A designated group of PDCP SDUs are not successfully received due to radio link failure.

Step 510: Re-transmitting all the PDCP SDUs from the first PDCP SDU of which the successful delivery of the corresponding PDCP PDUs have not been confirmed by the lower layer.

Step 520: Re-transmitting the PDCP SDUs of which the successful delivery of the corresponding PDCP PDUs have not been confirmed by the lower layer.

Step 530: Transmitting a PDCP status report configured by RRC to the transmitting PDCP entity.

Step 532: Re-transmitting the PDCP SDUs negatively acknowledged in the PDCP status report.

For a DRB mapped on RLC AM, header decompression in the receiving PDCP entity 320 may not work after resumption. For example, five compressed PDCP SDUs are not transmitted successfully by the transmitting PDCP entity 360 due to radio link failure. The compressor's context in the transmitting PDCP entity 360 has been updated but the decompressor's context in the receiving PDCP entity 320 has not been updated. To solve this problem, two solutions are proposed as below.

[Solution-4]: After a DRB mapped on RLC AM is resumed, the header compression protocol is reset by the transmitting PDCP entity 360 and the de-compression protocol is reset by the receiving PDCP entity 320.

[Solution-5]: After a DRB mapped on RLC AM is resumed, header compression and decompression protocols are not reset. The receiving PDCP entity 320 does not perform a header decompression on the received out-of-sequence PDCP SDUs in a reordering buffer if the out-of-sequence PDCP SDUs are received due to RLC re-establishment. The UE 310 further includes a timer Discard_Timer associated with the received PDCP SDUs, wherein the timer Discard_Timer is started to reorder the received out-of-sequence PDCP SDUs in the reordering buffer to generate received in-sequence PDCP SDUs when a DRB mapped on RLC AM is resumed. When the timer Discard_Timer expires, the receiving PDCP entity 320 performs a header decompression on the received in-sequence PDCP SDUs in the reordering buffer and then delivers the PDCP SDUs to the upper layer after decompression.

Figure 6:
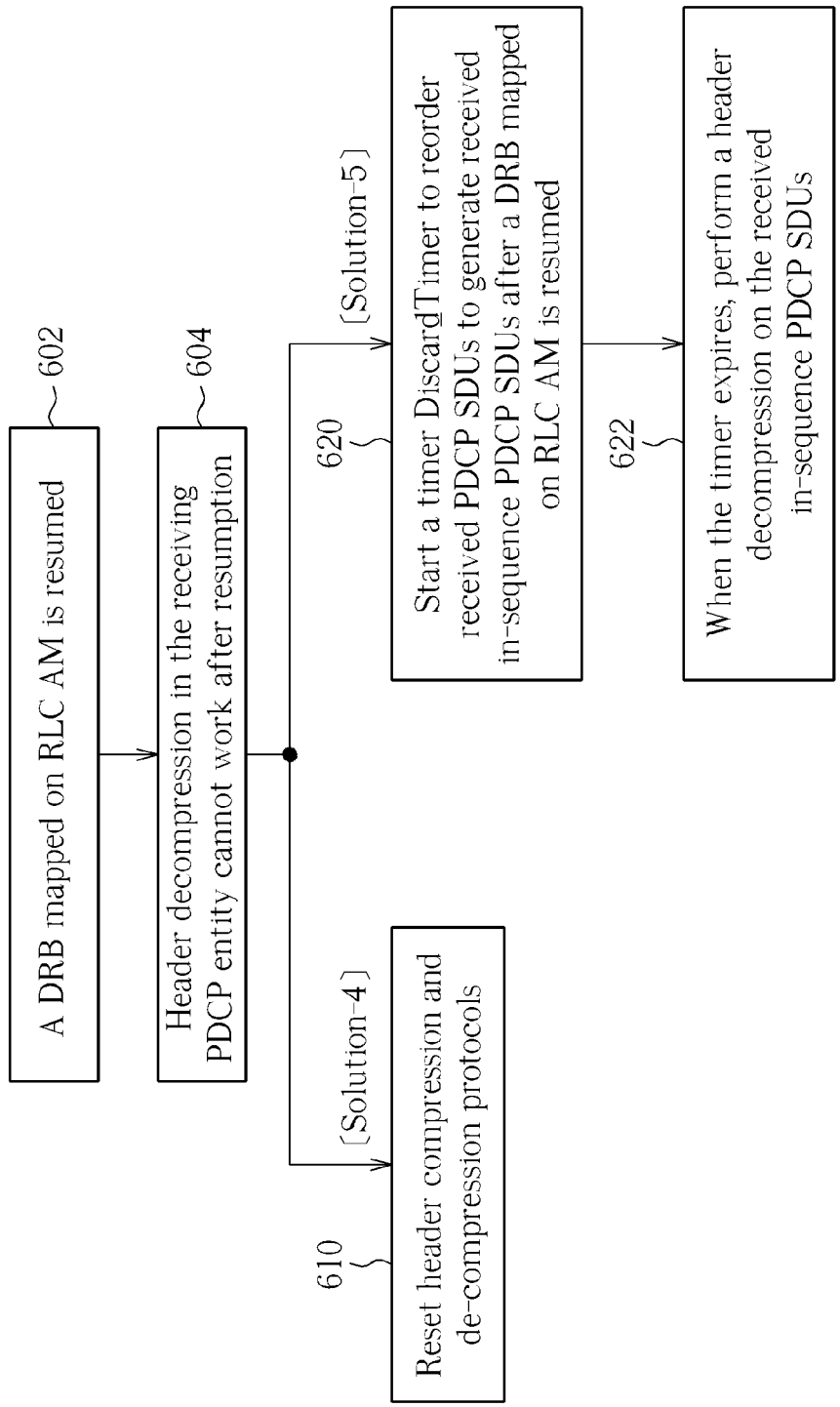
FIG. 6 is a flowchart illustrating a method for synchronizing PDCP operations after RRC Connection re-establishment in a wireless communication system according to another exemplary embodiment of the present invention.

The abovementioned solutions 4-5 are shown in FIG. 6, which is a flowchart illustrating a method for synchronizing PDCP operations after RRC Connection Re-establishment in a wireless communication system according to another exemplary embodiment of the present invention. The method includes the following steps:

Step 602: A DRB mapped on RLC AM is resumed.

Step 604: Header decompression in the receiving PDCP entity cannot work after resumption.

Step 610: Reset the header compression and de-compression protocols.

Step 620: Start a timer Discard Timer to reorder received PDCP SDUs to generate received in-sequence PDCP SDUs after a DRB mapped on RLC AM is resumed.

Step 622: When the timer expires, perform a header decompression on the received in-sequence PDCP SDUs.

A new base-key (KeNB) is always derived corresponding to the RRC Connection Re-establishment procedure. However, the lifetime of the new key is decreased due to waste of usable HFN and Sequence Number space if state variables of Next_PDCP_TX_SN, TX_HFN, Next_PDCP_RX_SN, and RX_HFN are not initiated to zero. The state variable Next_PDCP_TX_SN indicates the PDCP sequence number of the next PDCP SDU. The state variable TX_HFN indicates the HFN value for the generation of the COUNT value used for the PDCP PDUs. The state variable Next_PDCP_RX_SN indicates the next expected PDCP sequence number by the receiving PDCP entity. The state variable RX_HFN indicates the HFN value for the generation of the COUNT value used for the received PDCP PDUs. To avoid the inefficient key usage, one solution is proposed as below.

[Solution-6]: After a DRB mapped on RLC AM is resumed, the state variables of Next_PDCP_TX_SN and TX_HFN are reset to initial values by the transmitting PDCP entity 360. The state variables of Next_PDCP_RX_SN and RX_HFN are reset to initial values by the receiving PDCP entity 320.

The abovementioned solution 6 is shown in FIG. 7, which includes the following steps:

Step 702: A DRB mapped on RLC AM is resumed.

Step 704: The lifetime of a new key KeNB is decreased due to waste of usable HFN and Sequence Number space.

Step 710: Reset the state variables of Next_PDCP_TX_SN, TX_HFN, Next_PDCP_RX_SN, and RX_HFN to initial values, respectively.

As mentioned above, a new base-key (KeNB) is always derived corresponding to the RRC Connection Re-establishment procedure. A new ciphering key is also generated from the new KeNB. However, it is not clear which ciphering key (old or new) is used to cipher and decipher the retransmitted PDCP PDUs proposed in the solutions 1-3. To solve this problem, one solution is proposed as below.

[Solution-7]: The retransmitted PDCP PDUs are ciphered with the new ciphering key derived by a new KeNB generated by the RRC Connection Re-establishment procedure.

The abovementioned solution 7 is shown in FIG. 8, which includes the following steps:

Step 802: Perform an RRC Connection Re-establishment procedure.

Step 804: After a DRB mapped on RLC AM is resumed, re-transmit a designated group of PDCP SDUs being not successfully received.

Step 806: Generate a new KeNB corresponding to the RRC Connection Re-establishment procedure, and generate a new ciphering key from the new KeNB.

Step 810: Utilize the new ciphering key to cipher the re-transmitted PDCP SDUs.

For a DRB mapped on RLC UM, header decompression in the receiving PDCP entity 320 may not work after resumption. For example, five compressed PDCP SDUs are not transmitted successfully by the transmitting PDCP entity 360 due to radio link failure. The compressor's context in the transmitting PDCP entity 360 has been updated but the decompressor's context in the receiving PDCP entity 320 has not been updated. To solve this problem, one solution is proposed as below.

[Solution-8]: After a DRB mapped on RLC UM is resumed, the header compression protocol is reset by the transmitting PDCP entity 360 and the de-compression protocol is reset by the receiving PDCP entity 320.

The abovementioned solution 8 is shown in FIG. 9, which includes the following steps:

Step 902: A DRB mapped on RLC UM is resumed.

Step 904: Header decompression in the receiving PDCP entity cannot work after resumption.

Step 910: Reset the header compression and de-compression protocols.

In this embodiment, a DRB mapped on RLC UM is resumed. As mentioned above, a new KeNB is always derived corresponding to the RRC Connection Re-establishment procedure. However, the lifetime of the new key is decreased due to waste of usable HFN and Sequence Number space if state variables of Next_PDCP_TX_SN, TX_HFN, Next_PDCP_RX_SN, and RX_HFN are not initiated to zero. To avoid the inefficient key usage, one solution is proposed as below.

[Solution-9]: After a DRB mapped on RLC UM is resumed, the state variables of Next_PDCP_TX_SN and TX_HFN are reset to initial values by the transmitting PDCP entity 360. The state variables of Next_PDCP_RX_SN and RX_HFN are reset to initial values by the receiving PDCP entity 320.

The abovementioned solution 9 is shown in FIG. 10, which includes the following steps:

Step 1002: A DRB mapped on RLC UM is resumed.

Step 1004: The lifetime of a new key KeNB is decreased due to waste of usable HFN and Sequence Number space.

Step 1010: Reset the state variables of Next_PDCP_TX_SN, TX_HFN, Next_PDCP_RX_SN, and RX_HFN to initial values, respectively.

In this embodiment, SRB1 and SRB2 are resumed. As mentioned above, a new KeNB is always derived corresponding to the RRC Connection Re-establishment procedure. However, the lifetime of the new key is decreased due to waste of usable HFN and Sequence Number space if state variables of Next_PDCP_TX_SN, TX_HFN, Next_PDCP_RX_SN, and RX_HFN are not initiated to zero. To avoid the inefficient key usage, one solution is proposed as below.

[Solution-10]: After an SRB1 and an SRB2 are resumed, the state variables of Next_PDCP_TX_SN and TX_HFN are reset to initial values by the transmitting PDCP entity 360. The state variables of Next_PDCP_RX_SN and RX_HFN are reset to initial values by the receiving PDCP entity 320.

The abovementioned solution 10 is shown in FIG. 11, which includes the following steps:

Step 1102: SRB1 and SRB2 are resumed.

Step 1104: The lifetime of a new key KeNB is decreased due to waste of usable HFN and Sequence Number space.

Step 1110: Reset the state variables of Next_PDCP_TX_SN, TX_HFN, Next_PDCP_RX_SN, and RX_HFN to initial values.

The steps of the methods mentioned above are merely practicable embodiments of the present invention, and in no way should be considered to be limitations of the scope of the present invention. The methods can include other intermediate steps or several steps can be merged into a single step for suitable modifications without departing from the spirit of the present invention.

Of course, the abovementioned embodiments are merely examples for illustrating features of the present invention and should not be seen as limitations of the present invention. It will be obvious to those skilled in the art that various modifications on the mechanism for synchronizing PDCP operations after RRC Connection Re-establishment in a wireless communication system may be made without departing from the spirit of the present invention, and this should also belong to the scope of the present invention.

The abovementioned embodiments are presented merely for describing features of the present invention, and in no way should be considered to be limitations of the scope of the present invention. In summary, the present invention provides a method for synchronizing PDCP operations after RRC Connection Re-establishment in a wireless communication system and a related device. Through adopting the mechanism disclosed in the present invention, the abovementioned issues raised due to the RRC Connection Re-establishment can be solved. For example, the missing PDCP SDU issue in RLC AM can be solved by adopting the solutions 1-3; the header decompression fail issue can be solved by adopting the solutions 4-5 and 8; the inefficient key usage issue can be solved by adopting the solutions 6, 9, and 10; and the ciphering key issue can be solved by adopting the solution 7. Therefore, the PDCP operations between the UE and the E-UTRAN after RRC Connection Re-establishment can be synchronized to avoid the issues mentioned above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for synchronizing Packet Data Convergence Protocol (PDCP) operations with another communication device, the communication device comprising:
   means for initiating an RRC Reconfiguration procedure to resume a radio bearer other than a signaling radio bearer 1 (SRB1) when an RRC connection is re-established;
   means for transmitting a group of PDCP Service Data Units (SDUs) when the radio bearer (RB) is resumed;
   means for generating a new base-key (KeNB) corresponding to a Radio Resource Control (RRC) connection re-establishment procedure, and generating a new ciphering key from the new KeNB; and
   means for utilizing the new ciphering key to cipher the transmitted PDCP SDUs when the RRC connection is re-established.

2. The communication device of claim 1, wherein the communication device is an Evolved UMTS Terrestrial Radio Access Network (E-UTRAN), and the other communication device is a user equipment (UE), or the communication device is a user equipment (UE), and the other communication device is an Evolved UMTS Terrestrial Radio Access Network (E-UTRAN).

3. A communication device for synchronizing Packet Data Convergence Protocol (PDCP) operations with another communication device, the communication device comprising:
   means for resuming a radio bearer other than a signaling radio bearer 1 (SRB1) when an RRC connection is re-established;
   means for receiving a group of PDCP Service Data Units (SDUs) transmitted from the other communication device when the radio bearer (RB) is resumed;
   means for generating a new base-key (KeNB) corresponding to a Radio Resource Control (RRC) connection re-establishment procedure, and generating a new ciphering key from the new KeNB; and
   means for utilizing the new ciphering key to decipher the received PDCP SDUs when the RRC connection is re-established.

4. The communication device of claim 3, wherein the communication device is an Evolved UMTS Terrestrial Radio Access Network (E-UTRAN), and the other communication device is a user equipment (UE), or the communication device is a user equipment (UE), and the other communication device is an Evolved UMTS Terrestrial Radio Access Network (E-UTRAN).

5. A method of synchronizing Packet Data Convergence Protocol (PDCP) operations with a user equipment (UE), the method comprising:
   initiating an RRC Reconfiguration procedure to resume a radio bearer other than a signaling radio bearer 1 (SRB1) when an RRC connection is re-established;
   transmitting a group of PDCP Service Data Units (SDUs) to the UE when the radio bearer (RB) is resumed;
   generating a new base-key (KeNB) corresponding to a Radio Resource Control (RRC) connection re-establishment procedure, and generating a new ciphering key from the new KeNB; and
   utilizing the new ciphering key to cipher the transmitted PDCP SDUs when the RRC connection is re-established.

6. A method synchronizing Packet Data Convergence Protocol (PDCP) operations with an Evolved UMTS Terrestrial Radio Access Network (E-UTRAN), the method comprising:
   resuming a radio bearer other than a signaling radio bearer 1 (SRB1) when an RRC connection is re-established;
   receiving a group of PDCP Service Data Units (SDUs) transmitted from the E-UTRAN when the radio bearer (RB) is resumed;
   generating a new base-key (KeNB) corresponding to a Radio Resource Control (RRC) connection re-establishment procedure, and generating a new ciphering key from the new KeNB; and
   utilizing the new ciphering key to decipher the received PDCP SDUs when the RRC connection is re-established.

7. The communication device of claim 1, wherein the radio bearer is a data radio bearer, DRB.

8. The communication device of claim 3, wherein the radio bearer is a data radio bearer, DRB.

9. The method of claim 5, wherein the radio bearer is a data radio bearer, DRB.

10. The method of claim 6, wherein the radio bearer is a data radio bearer, DRB.

* * * * *